United States Patent
Arif

(10) Patent No.: US 11,022,013 B2
(45) Date of Patent: Jun. 1, 2021

(54) MULTIPURPOSE AIR POLLUTION AND HEAT REDUCING DEVICE

(71) Applicant: Mirza Mohammad Arif, New Delhi (IN)

(72) Inventor: Mirza Mohammad Arif, New Delhi (IN)

(*) Notice: Subject to any disclaimer, the term of this patent is extended or adjusted under 35 U.S.C. 154(b) by 236 days.

(21) Appl. No.: 16/073,095

(22) PCT Filed: Jan. 25, 2017

(86) PCT No.: PCT/IN2017/000018
§ 371 (c)(1),
(2) Date: Jul. 26, 2018

(87) PCT Pub. No.: WO2017/130215
PCT Pub. Date: Aug. 3, 2017

(65) Prior Publication Data
US 2018/0328245 A1 Nov. 15, 2018

(30) Foreign Application Priority Data
Jan. 27, 2016 (IN) .............................. 201611002839

(51) Int. Cl.
*B01D 47/02* (2006.01)
*F01N 3/04* (2006.01)
*B01D 53/14* (2006.01)

(52) U.S. Cl.
CPC .............. *F01N 3/04* (2013.01); *B01D 47/02* (2013.01); *B01D 47/021* (2013.01);
(Continued)

(58) Field of Classification Search
CPC ............ B01D 47/00–02; B01D 47/021; B01D 47/028; B01D 53/14; F01N 3/04
See application file for complete search history.

(56) References Cited
U.S. PATENT DOCUMENTS

| | | | | |
|---|---|---|---|---|
| 2,678,261 | A | * | 5/1954 | Ruth .......................... F01N 3/04 422/177 |
| 2,785,962 | A | * | 3/1957 | Ruth .......................... F01N 3/04 422/170 |

(Continued)

FOREIGN PATENT DOCUMENTS

CN 104043302 B 9/2014

*Primary Examiner* — Renee Robinson
(74) *Attorney, Agent, or Firm* — Albert Bordas, P.A.

(57) ABSTRACT

A multipurpose pollution reducing-device is shown. The device comprises a tank 1 adapted to be secured with a stand 2 and to store pollution reducing liquid 3 therein. At least one layer of the pebbles 4, constituting a filter layer, is provided inside the tank 1 at the bottom thereof. At least one inlet tube 5 passing through the bottom of the tank 1 is provided for' allowing entry of the exhaust pollutants into the tank 1. Corresponding perforated inverted tube 6 is provided over the inlet tube 5 such that to discharge exhaust with pollutants near the bottom end of the tank 1. A liquid filling tube 10 is provided at the top end of the tank 1, A liquid level indicator 12 secured to the tank 1 is provided to indicate liquid level present in the tank 1. At least one layer of gauge filer 15 disposed in the tank 1 above the liquid level. An outlet 7 is provided near top end of the tank 1 for facilitating exit of the clean exhaust from the device.

8 Claims, 1 Drawing Sheet

(52) U.S. Cl.
CPC ........... *B01D 47/028* (2013.01); *B01D 53/14* (2013.01); *F01N 2590/08* (2013.01); *F01N 2590/10* (2013.01); *Y02T 10/12* (2013.01)

(56) References Cited

U.S. PATENT DOCUMENTS

| | | | | |
|---|---|---|---|---|
| 2,849,294 A * | 8/1958 | Ruth | .......................... | F01N 3/04 422/106 |
| 2,877,098 A * | 3/1959 | Ruth | .......................... | F01N 3/04 422/177 |
| 2,998,308 A * | 8/1961 | Ruth | ...................... | B01D 46/30 422/186 |
| 2004/0255779 A1 * | 12/2004 | Trivett | ................. | B01D 50/004 95/226 |

* cited by examiner

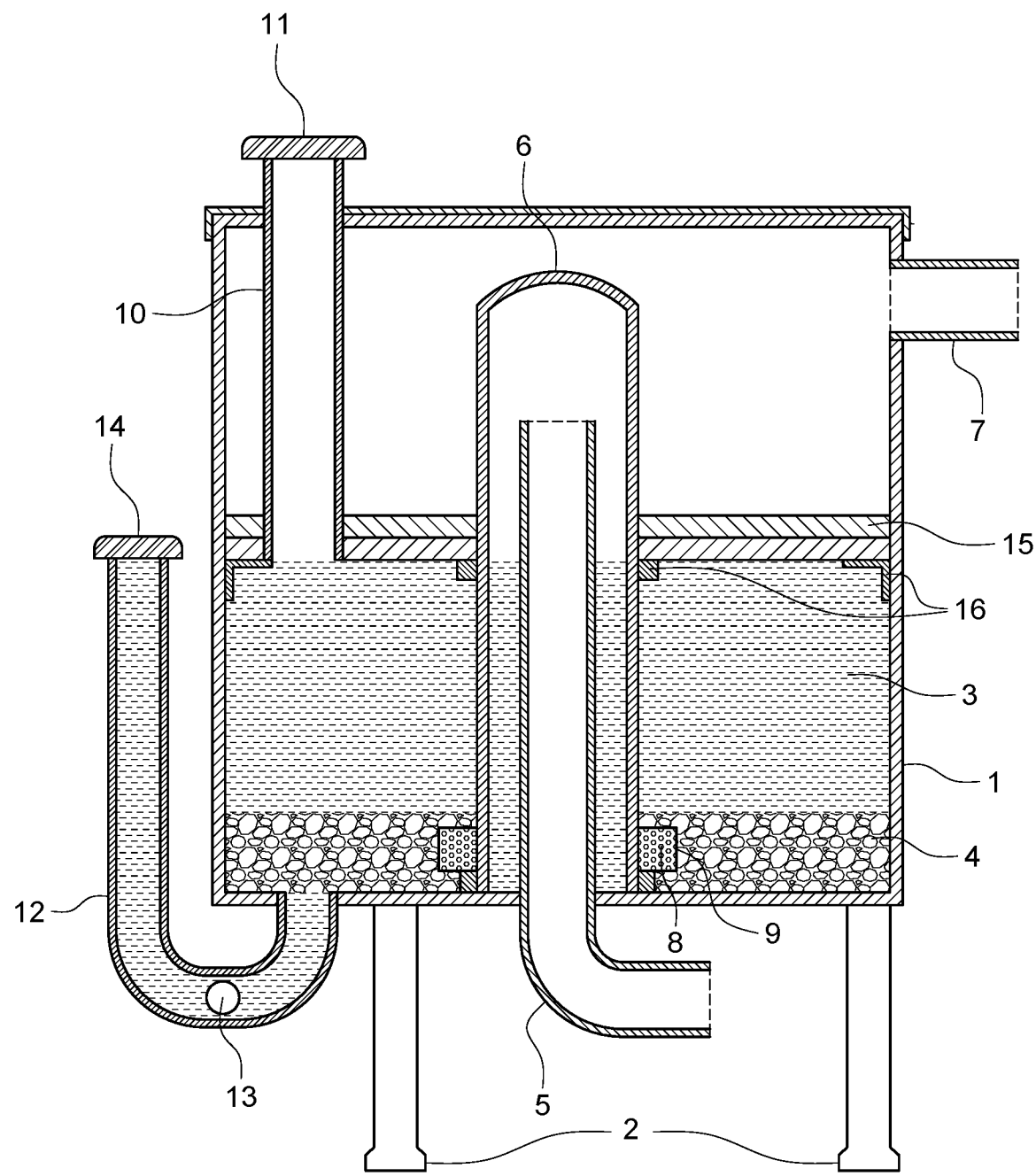

MULTIPURPOSE AIR POLLUTION AND HEAT REDUCING DEVICE

FIELD OF INVENTION

This invention relates to a multipurpose air pollution & heat reducing device. The device reduces all types of pollution like air pollution of suspended particles and or dissolved gases, noise and thermal pollution. The device is adapted to be used with automobiles, diesel electric generating sets, chimney and factory exhaust outlets.

PRIOR ART

Pollution reduction devices, for example, dry filters, silencers, chimney etc. are used to filter and purify exhaust gases coming out of automobiles, automobile industry and other pollution causing engines. The silencers are used to reduce the noise being created by the automobiles and engines. The dry filters are used in the chimney to reduce the suspended particles present in the smoke coming out from the industry and thus air pollution is avoided.

It is also known to use air purifiers in the chemical industries so as to reduce the specific kind of pollutants/chemical present in the exhaust coming out from the chemical, rubber, PVC and Bakelite etc. industries.

Also, some pollution reducing devices operated with the help of electric energy known are known to reduce the pollution.

There are disadvantages associated with the prior art. One of the disadvantages is that conventional filters do not completely remove the pollutants, for example, suspended particles and harmful gases, oil droplets from the exhausts.

Another disadvantage associated with the prior art is that conventional filters do not completely remove the chemical fumes and oil droplets from the exhausts.

Yet another disadvantage is that conventional filters do not remove the heat from the exhausts.

Hence, there is a need to develop/invent a filtration device capable to remove the pollutants from the exhaust and overcome the above disadvantages.

OBJECTS OF THE INVENTION

Therefore, an object of the present invention is to provide a multipurpose air pollution & heat reducing device capable to remove the pollutants from the exhaust.

Another object of the present invention is provide a multipurpose air pollution & heat reducing device capable of reducing maximum level of pollution in respect of air, noise and heat.

Yet another object of the present invention is to provide a multipurpose air pollution & heat reducing device which has a long life as it does not have any moving part.

Still another object of the present invention is to provide a multipurpose air pollution & heat reducing device which does not use any motive power such as electric, electronic, pneumatic, hydraulic or any other type of energy.

A further object of the present invention is to provide a multipurpose air pollution & heat reducing device which is compact and can be fitted easily on to any existing system.

Another object of the present invention is to provide a multipurpose air pollution & heat reducing device which reduces overall pollution in the surrounding environment, and would lead to a cleaner environment.

Yet another object of the present invention is to provide a multipurpose air pollution & heat reducing device which helps in reducing global warming.

STATEMENT OF THE INVENTION

According to this invention there is provided a multipurpose air pollution & heat reducing device comprising a tank adapted to be secured with a stand and to store pollution reducing liquid therein, at least one layer of the pebbles, constituting a filter layer, being provided inside the tank at the bottom thereof, at least one inlet tube passing through the bottom of the tank being provided for allowing entry of the exhaust pollutants into the tank, corresponding perforated inverted tube being provided over the inner tube such that to discharge exhaust with pollutants near the bottom end of the tank, a liquid filling tube being provide at the top end of the tank, a liquid level indicator secured to the bottom of the tank being provided to indicate liquid level present in the tank, at least one layer of gauze filer disposed in the tank above the liquid level, an outlet being provided near top end of the tank for facilitating exit of the clean exhaust from the device.

BRIEF DESCRIPTION OF THE ACCOMPANYING DRAWINGS

A multipurpose pollution & heat reducing device according to a preferred embodiment of the present invention is herein described and illustrated in the accompanying drawing s, wherein:

FIGURE illustrates a sectional elevation of the device

DETAILED DESCRIPTION

A multipurpose air pollution and heat reducing device is herein described with numerous specific details so as to provide a complete understanding of the invention. However these specific details are exemplary details and should not be treated as the limitation to the scope of the invention. Throughout this specification the word "comprise" or variations such as "comprises or comprising", will be understood to imply the inclusions of a stated element, integer or step, or group of elements, integers or steps, but not the exclusions of any other element, integer or step or group of elements, integers or steps.

Referring to the drawing, FIG. 1 shows a multipurpose air pollution & heat reducing device. The pollution reducing device comprises a tank 1 of any shape and size to suit the requirement and is adapted to be secured with a stand 2 provided for securing the device with the vehicle and/or any other pollution generating device, engine or chimney. Pollution reducing liquid 3 is provided in the tank 1 for filtration purposes. At least one layer of pebbles 4 is provided inside the tank 1 at its bottom. The layer of the pebbles 4 acts like a filter and is provided for filtering of the exhaust, having pollutants entrapped therein. At least one inlet tube 5 passing through the bottom of the tank is disposed in the tank 1 for allowing entry of the exhaust in the tank 1. The inlet tube 5 is disposed in the tank 1 such that the open end of the tube remains above liquid level in the tank 1. An inverted tube 6 is provided over the inlet tube 5 such that to discharge the exhaust with pollutants, received from a vehicle/industry and/or an engine or chimney near the bottom end of the tank 1 through the layer of pebbles 4. The inverted tube 6 is secured to the inner surface of the tank 1. The exhaust with pollutants is to pass through the filtering liquid 3 filled in the tank 1 and then it passes through a filter layers of pebbles 4 disposed in the tank 1. An outlet 7 is provided near the top end of the tank 1 for the exit of the filtered/purified exhaust/smoke/air.

The inverted tube 6 has perforation 8 near the lower end thereof such that to allow passage of the exhaust there through into the tank 1 having liquid 3 filled into the tank 1. The perforations 8 are provided in the inverted tube 6 at lower end and till the height up to which the pebbles 4 are filled in the tank 1. The perforations 8 are covered with a gauze filter 9. In one embodiment plurality of layers of the pebbles 4, of different sizes, may be provided in the lower portion of the tank 1. According to an embodiment, plurality of inlet tubes 5 with corresponding inverted tubes 6 provided over the inlet tube 5 are provided as per the requirement of the user and to suit the heavy automobiles, engine or chimney.

A liquid filling tube 10 is disposed into the tank 1 through its top end to fill the liquid 2 into the tank 1 up to a level such that all the filters 4, gauze filter 9 and other fitters are soaked with the liquid 3. The liquid filling tube 10 passes through the top end of the tank 1 and is submerged into the liquid 3 provided in the tank. A lid 11 is provided at the top end of the liquid filling tube 10 so as to cover it in an air tight manner.

A liquid level indicator 12 is provided with the tank so as to maintain the level of the liquid with in the tank 1 by filling the liquid 3 as and when required. A liquid drainage valve 13 is provided at the bottom of the liquid level indicator 12 to drain out the contaminated liquid 3 from the tank 1. A cover 14 is provided over the open top end of the level indicator 12. Fresh liquid 3 is filled in the tank 1 as and when required.

In one embodiment bottom end of the inlet tube 5 is connected to a manifold (not shown) such that to connect the inlet tube 5 with a hose pipe (not shown) being connected with the exhaust port (not shown) of a heavy vehicle, engine or chimney.

According to an embodiment, at least one layer of another gauze filter 15 is disposed in the tank 1 above the liquid 3 level. According to another embodiment, plurality of gauze filter 15 layers are provided above the liquid 3 level and supported on the supports 16.

The filter liquid comprises a liquid, for example, water or coolant capable to absorb the pollutants entrapped in the exhaust. Thus the liquid absorbs the suspended impurities present in the exhaust and also reduces the heat and the noise. The liquid also absorb dissolved harmful gases or particles, for example, Carbon monoxide or any other gases, present in the exhaust.

In one embodiment, a suction device, for example, an exhaust fan or blower (not shown) is provided with the inlet tube 5 or with the outlet 7 so as to create the pressure difference as the device works on the principal of pressure difference at the inlet tube 5 and the outlet 7 of the device.

The device is mounted at the exhaust outlet of the vehicle, automobile, chimney or anywhere where the pollution is required to be reduced. The exhaust with pollutants enter into the tank 1 of the device through the inlet tube 5, inverted tube 6 and then it passes through the gauze filter 9 to pass thorough the liquid 3 contained in the tank 1. Thus, the exhaust passes through a zig zag passage and through various filters i.e. pebble 4 filter, gauze filter 9, liquid 3 and again another gauze filters 15 and gets filtered. Thus the clean exhaust comes out of the device. In fact the exhaust first moves up in the inlet tube 5 and then moves down and passes through the liquid 3 in the inverted tube 6. The exhaust then enters into the filter layer of pebbles 4 through the perforation 8 provided at the bottom end of the inverted tube 6 and having a gauze filter 9 provided around the perforations 8. The exhaust then passes through liquid filter 3 and again through the gauze filters 15 to move upward before coming out as filtered/clean exhaust.

It has been noticed that by using this device pollution level reduces in the following manner;

Particles emitted from the burned fuel 70-80%
Air Pollution 60-90%
Green House Gases 60-70%
Noise Pollution 70-80%
Heat Reduction in Exhaust Gases 60-70%

Certain features of the invention have been described with reference to the example embodiments. However, the description is not intended to be construed in a limiting sense. Various modifications of the example embodiments as well as other embodiments of the invention, which are apparent to the persons skilled in the art to which the invention pertains, are deemed to lie within the spirit and scope of the invention.

I claim:

1. A multipurpose air pollution and heat reducing device comprising:
   A) a tank having a bottom wall, a tank sidewall and a top wall defining a unique closed space therein, said tank adapted to be filled with a liquid for pollution reducing therein;
   B) a pebble section comprising at least one layer of pebbles, said at least one layer of pebbles comprising pebbles of different sizes, said pebble section being disposed on said bottom wall covering a lowest portion of said tank, said pebble section being configured to function as a filter layer;
   C) at least one inlet tube comprising a top open end and a bottom open end, said at least one inlet tube extending upwardly from outside said tank through said bottom wall a first predetermined distance from said bottom wall inside said tank, said at least one inlet tube is configured to allow an entrance of exhaust pollutants into said tank;
   D) an outlet tube being disposed at said tank sidewall at a second predetermined distance from said bottom wall, said second predetermined distance is cooperatively close enough to said top wall to facilitate an exit of a clean exhaust gas from said tank;
   E) an inverted tube defining a chamber and comprising an inverted tube sidewall with a closed top and a bottom edge, said bottom edge is fixed to said bottom wall inside said tank, said inverted tube sidewall comprises perforations disposed adjacent to said bottom edge, each of said perforations is covered with a perforation filter and said perforations are disposed within said pebble section, said inverted tube surrounds said at least one inlet tube to enable said exhaust pollutants to exit through said top open end of said at least one inlet tube that is inside said inverted tube and is forced to exit through said perforations;
   F) at least one layer of gauze filter being held in place by at least one support, said at least one layer of gauze filter having a bottom surface;
   G) a liquid level indicator extending downwardly from said bottom wall and having a J-shape, said liquid level indicator comprising an open top end with a cover and a bottom bend portion that is lower than the bottom wall, said liquid level indicator comprising a liquid drainage valve at its lower portion, said liquid level indicator shows liquid level inside said tank, said liquid drainage valve drains said liquid from said tank when said liquid is contaminated; and H) a liquid filling tube having a lid and a bottom end, said liquid filling tube extending downwardly from outside said tank through said top wall and through said at least one layer of gauze filter, said bottom end being fixed below said at least one layer of gauze filter, said tank is fed with said liquid until said liquid level surpasses said pebble section and reaches said at least one layer of gauze filter.

2. The multipurpose air pollution and heat reducing device as claimed in claim 1, wherein said top open end of said at least one inlet tube is above said liquid level.

3. The multipurpose air pollution and heat reducing device as claimed in claim 2, wherein said at least one support are fixed to said tank sidewall.

4. The multipurpose air pollution and heat reducing device as claimed in claim 3, wherein said at least one support hold said bottom surface of said at least one layer of gauze filter above said liquid level, also said at least one support hold said bottom end of said liquid filling tube fixedly aligned with said bottom surface.

5. The multipurpose air pollution and heat reducing device as claimed in claim 4, wherein said exhaust pollutants entering through said bottom open end exit through said top open end into said inverted tube, then said exhaust pollutants go into said at least one layer of pebbles through said perforations and said perforation filter, said exhaust pollutants are filtered through said liquid and said at least one layer of gauze filter, finally said clean exhaust gas exist exits from said tank through said outlet tube.

6. The multipurpose air pollution and heat reducing device as claimed in claim 5, wherein an exhaust fan or blower is connected to each of at least one inlet tube and/or said outlet tube.

7. The multipurpose air pollution and heat reducing device as claimed in claim 5, wherein said liquid comprises water or coolant capable to absorb pollutants, impurities, harmful gases and particles from said exhaust pollutants.

8. The multipurpose air pollution and heat reducing device as claimed in claim 1, wherein said tank is adapted to be secured to a stand.

\* \* \* \* \*